(12) United States Patent
Tofighbakhsh et al.

(10) Patent No.: US 10,820,324 B2
(45) Date of Patent: *Oct. 27, 2020

(54) COLLABORATIVE RADIO RESOURCES ALLOCATIONS TO APPLICATIONS OF MOBILE UNITS

(71) Applicants: AT&T Intellectual Property I, L.P., Atlanta, GA (US); INTEL CORPORATION, Santa Clara, CA (US); VENTURI WIRELESS, INC., San Jose, CA (US)

(72) Inventors: Mostafa Tofighbakhsh, Cupertino, CA (US); Vivek Gupta, San Jose, CA (US); Krishna Ramadas, Cupertino, CA (US)

(73) Assignees: AT&T INTELLECTUAL PROPERTY I, L.P., Atlanta, GA (US); VENTURI WIRELESS, INC., San Jose, CA (US); APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/177,386

(22) Filed: Oct. 31, 2018

(65) Prior Publication Data
US 2019/0075557 A1 Mar. 7, 2019

Related U.S. Application Data

(63) Continuation of application No. 14/927,460, filed on Oct. 29, 2015, now Pat. No. 10,149,299, which is a
(Continued)

(51) Int. Cl.
*H04W 72/04* (2009.01)
*H04W 48/18* (2009.01)
(Continued)

(52) U.S. Cl.
CPC ......... *H04W 72/048* (2013.01); *H04W 48/18* (2013.01); *H04W 72/042* (2013.01);
(Continued)

(58) Field of Classification Search
CPC . H04W 72/048; H04W 72/042; H04W 72/08; H04W 72/0846; H04W 48/18; H04W 72/0486
See application file for complete search history.

(56) References Cited

U.S. PATENT DOCUMENTS 6,842,614 B2    1/2005  Noe
8,478,320 B2 *  7/2013  Tofighbakhsh ....... H04W 48/18
                                                     455/509
(Continued)

OTHER PUBLICATIONS

Ex Parte Quayle Action dated Dec. 21, 2012 for U.S. Appl. No. 12/966,868, 46 pages.
(Continued)

*Primary Examiner* — Chi H Pham
*Assistant Examiner* — Weibin Huang
(74) *Attorney, Agent, or Firm* — Amin, Turocy & Watson, LLP

(57) ABSTRACT

Collecting state information about the resources of radio access networks (RANs) and the Access Point Names (APNs) enables this information to be provided to mobile stations which employ this information to determine which radio access technology (RAT) to employ for connecting to the wireless access network, and to determine which APN to use. This decision is made relative to each application that the mobile station is executing, and these decisions are, optionally, revisited periodically, or as significant changes in the state information are recognized.

20 Claims, 3 Drawing Sheets

Related U.S. Application Data continuation of application No. 13/908,673, filed on Jun. 3, 2013, now Pat. No. 9,204,446, which is a continuation of application No. 12/966,868, filed on Dec. 13, 2010, now Pat. No. 8,478,320.

(51) Int. Cl.
*H04W 72/08* (2009.01)
*H04W 88/06* (2009.01)

(52) U.S. Cl.
CPC ....... *H04W 72/0486* (2013.01); *H04W 72/08* (2013.01); *H04W 88/06* (2013.01)

(56) References Cited

U.S. PATENT DOCUMENTS

| | | | | |
|---|---|---|---|---|
| 9,204,446 | B2* | 12/2015 | Tofighbakhsh | H04W 48/18 |
| 10,149,299 | B2* | 12/2018 | Tofighbakhsh | H04W 48/18 |
| 2004/0095916 | A1 | 5/2004 | Maki et al. | |
| 2007/0105589 | A1* | 5/2007 | Lu | H04W 88/02 |
| | | | | 455/556.2 |
| 2007/0281710 | A1* | 12/2007 | Bai | H04W 16/10 |
| | | | | 455/452.1 |
| 2009/0104907 | A1* | 4/2009 | Otting | H04W 48/10 |
| | | | | 455/435.3 |
| 2009/0247201 | A1* | 10/2009 | Ye | H04W 16/14 |
| | | | | 455/509 |
| 2010/0075665 | A1* | 3/2010 | Nader | H04J 11/0093 |
| | | | | 455/426.1 |
| 2010/0234042 | A1* | 9/2010 | Chan | H04W 36/22 |
| | | | | 455/453 |
| 2011/0195715 | A1* | 8/2011 | Wu | H04W 48/08 |
| | | | | 455/436 |
| 2012/0054840 | A1* | 3/2012 | Gupta | H04L 69/18 |
| | | | | 726/5 |
| 2015/0003243 | A1* | 1/2015 | Klingenbrunn | H04W 76/22 |
| | | | | 370/230 |
| 2015/0078156 | A1* | 3/2015 | Fodor | H04W 48/18 |
| | | | | 370/230 |

OTHER PUBLICATIONS

Notice of Allowance dated Mar. 4, 2013 for U.S. Appl. No. 12/966,868, 47 pages.
Non-Final Office Action dated Feb. 10, 2015 for U.S. Appl. No. 13/908,673, 21 pages.
Notice of Allowance dated Jul. 30, 2015 for U.S. Appl. No. 13/908,673, 25 pages.
Non-Final Office Action dated Jun. 2, 2017 for U.S. Appl. No. 14/927,460, 17 pages.
Non-Final Office Action dated Oct. 17, 2017 for U.S. Appl. No. 14/927,460, 19 pages.
Non-Final Office Action dated Mar. 9, 2018 for U.S. Appl. No. 14/927,460, 17 pages.
Notice of Allowance dated Jul. 30, 2018 for U.S. Appl. No. 14/927,460, 12 pages.

* cited by examiner

FIG. 5

| RAT WEIGHT | APN WEIGHT | BS WEIGHT |
|---|---|---|
| 2G = 7 | APN-21 = 2 | BS1 = 1 |
|  | APN-22 = 10 | BS2 = 3 |
|  | APN-23 = 5 | BS3 = 2 |
| 3G = 4 | APN-31 = 3 | BS1 = 4 |
|  | APN-32 = 5 | BS2 = 4 |
|  | APN-33 = 1 | BS3 = 2 |
| 3GFemto = 2 | APN-31 = 3 | BS1 = 0 |
|  | APN-33 = 10 |  |
|  | APN-34 = 2 |  |
| WiFi = 1 | APN-w1 = 5 | AP1 = 0 |
|  | APN-w2 = 3 |  |
|  | APN-w3 = 6 |  |

| TRAFFIC TYPE | RAT WEIGHT |
|---|---|
| Real Time | 2G = 1 |
|  | 3G = 3 |
|  | 4G = 2 |
| nRT (interactive) | 2G = 5 |
|  | 3G = 3 |
|  | 3GFemto = 1 |
|  | WiFi = 3 |
| nRT (background) | 2G = 5 |
|  | 3G = 2 |
|  | 3GFemto = 5 |
|  | WiFi = 3 |
| Best Effort | 2G = 1 |
|  | 3G = 1 |
|  | 3GFemto = 1 |
|  | WiFi = 1 |

COLLABORATIVE RADIO RESOURCES ALLOCATIONS TO APPLICATIONS OF MOBILE UNITS

CROSS-REFERENCE TO RELATED APPLICATIONS

This application is a continuation of, and claims priority to each of, U.S. patent application Ser. No. 14/927,460 (now U.S. Pat. No. 10,149,299), filed Oct. 29, 2015, and entitled "Collaborative Radio Resources Allocations To Applications Of Mobile Units," which claims priority to U.S. patent application Ser. No. 13/908,673 (now U.S. Pat. No. 9,204,446), filed Jun. 3, 2013, and entitled "Collaborative Radio Resources Allocations To Applications Of Mobile Units," which claims priority to U.S. patent application Ser. No. 12/966,868 (now U.S. Pat. No. 8,478,320), filed Dec. 13, 2010, and entitled "Collaborative Radio Resources Allocations To Applications Of Mobile Units," the entireties of which applications are hereby incorporated herein by reference.

BACKGROUND

This relates to telecommunication systems, e.g., to mobile stations and to networks that interact with the mobile stations.

Cell phone technologies have been advancing over the years. These advances were powered by (in addition to micro-miniaturization) innovations in coding and in protocols, by competition between companies within the US, and by the promulgation of different standards throughout the world. The successively adopted technologies typically provide more bandwidth, better geographical coverage, more effective protocols, more robustness and, consequently, more capabilities. Correspondingly, the networks that serve the cell phones were also advanced but, often, the advances were implemented so as to accommodate the older, legacy, technologies while use of the newer technologies was being spread.

The greater capabilities in the networks enabled the designs of phones with very sophisticated capabilities (often referred to as "smart phones") and to various other wireless devices such as wireless enabled cars/trains, sensory/eHealth devices, etc. Thus, current day cell phones and other mobile devices (collectively, mobile stations, or MSs) have capabilities that, to different degrees, take advantage of what is commonly referred to as 2G, 3G, and 4G and WiFi technologies. It is fully expected that other technologies will surely follow.

Value added services are often used at the boundary between a wireless operators network and the internet to enhance mobile user experience impacted by the limitations in wireless network. Value added service gateways such as WAP, Compression, Content Adaptation have been used to offset deficiencies in wireless access networks. Value added services such as content filtering, virus detection, and parental control are common to wireline and wireless access networks. Entities that operate networks use APNs to distinguish value added service options while leaving it to the mobile user to select such services.

Moreover, since the installed networks are capable of providing service to mobile stations that operate in different technologies, many mobile stations have been designed to operate in any one of a number of encountered technology environments. These mobile stations switch from one technology to another by active involvement of the MS user.

Better performance can be achieved if the mobile units were able to automatically select the technology that is to be employed, based on network conditions only. Still better performance can be achieved when those selections are application-centric and to be able to lock in to any necessary value added services at the boundary between the wireless operator network and the internet.

BRIEF DESCRIPTION OF THE DRAWINGS

FIG. 5 illustrates a matrix of information that is stored in element 18.

DETAILED DESCRIPTION

The General Packet Radio Service (GPRS) is an example of a wireless access network that interconnects mobile stations a data network. The GPRS is a random access packet data extension of the Global System for Mobile communications (GSM), using encapsulation and tunneling to transfer high and low speed data and signaling in an efficient manner. The GSM and GPRS standards are defined in technical specifications published by the European Telecommunications Standards institute (ETSI). These include ETSI GSM 03.03, ETSI GSM 03.60 and ETSI GSM 09.60, which are herein incorporated by reference.

Basically, GPRS radio channels are allocated in a TDMA frame, and the timeslots are shared by the active users. Uplink and downlink channels are allocated separately, and the radio interface resources may be shared dynamically between speech and data services, for example, based on load and operator preference. A variety of channel coding schemes are defined in the ETSI specification to provide a diversity of bit rates. Generally, applications based on standard data protocols are supported, and interworking is defined, with both IP networks and X.25.

An advance in the art is realized by modifying the wireless access network to collect state information about the radio access networks and the Access Point Names (APN), either periodically or as conditions dictate, and to provide this information to mobile stations that wish to use the wireless access network to reach a data network. The information, which is provided to enhanced mobile units, is stored in a database module within the enhanced mobile units, and the enhanced mobile units also includes means to use the received network state information to make routing selections. Specifically, a mobile station that is enhanced in accord with the principles disclosed herein uses the received network state information to determine which radio access technology (RAT) to employ for connecting the mobile station to the wireless access network, and to determine which APN to use. This decision is made relative to each application that the mobile station is executing, and these decisions are, optionally, revisited periodically, or as significant changes in the state information are recognized.

Figure 1:
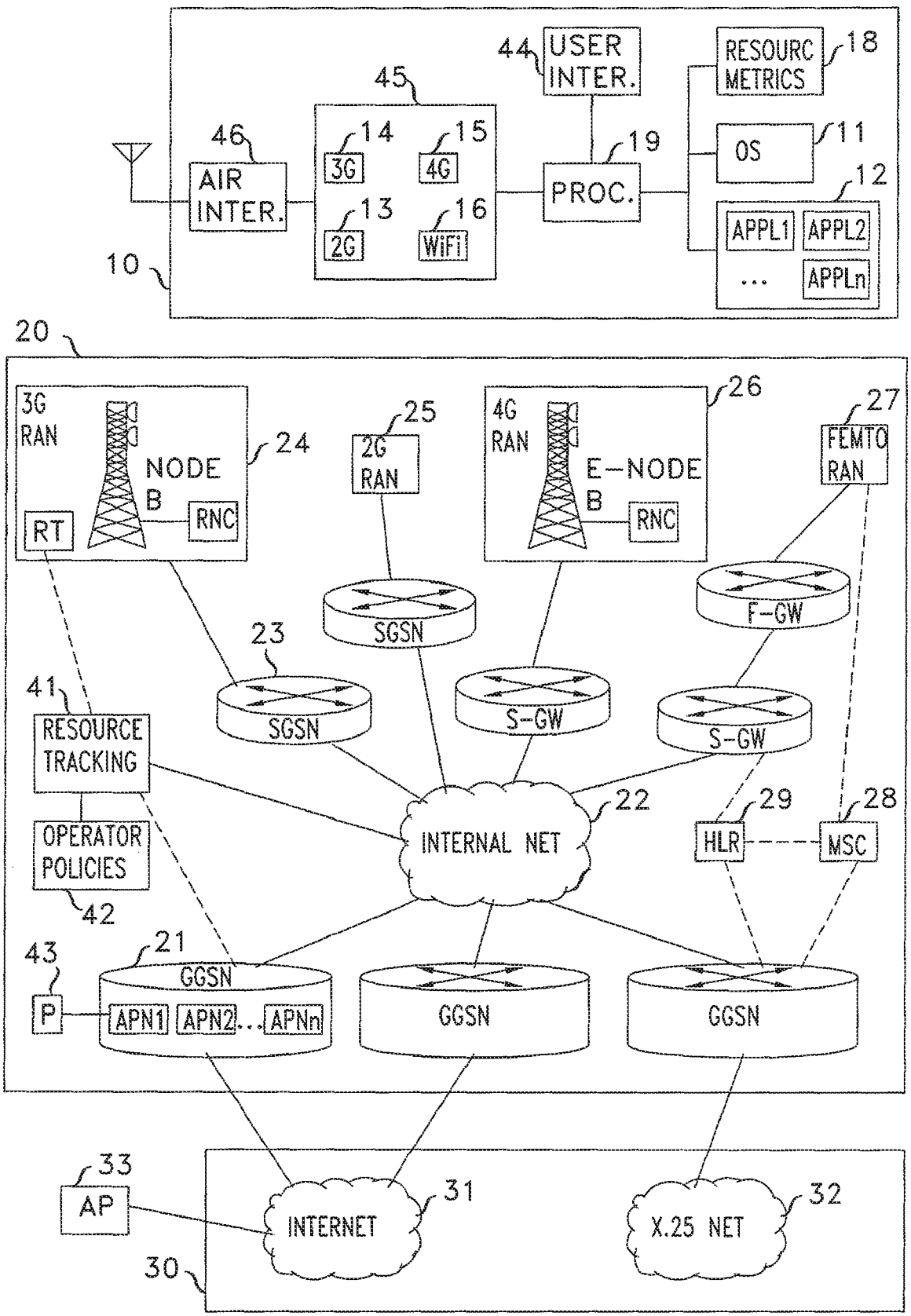
FIG. 1 presents an illustrative arrangement that includes a mobile station (MS 10), and a network 20 (henceforth, wireless access network) that is interposed between wireless MS 10 and a data network.

Illustratively, FIG. 1 presents mobile station 20, and wireless access network 20, which is a GPRS network, enhanced in accord with the principles disclosed herein, that is interposed between MS 10 and a network 30 that comprises one or more sub-networks, such as the Internet 31, and X.25 network 32. Both the wireless access network and the mobile station employ information about the network to assist in establishing connections to the data network for applications running on the mobile stations Mobile station 10, illustratively, is one that is capable of operating in what is commonly referred to as 2G, 3G, 4G, and WiFi technologies, by means of modules 13, 14, 15, and 16, respectively that are included in a radio access technology (RAT) module 45. Other RATS exist which MS 10 is illustratively not adapted to employ; for example, LTE (Long Term Evolution) which some refer to as 3.9G technology. MS 10 includes a processor 19, a user interface module 44 coupled to processor 19, an air interface module 46, and a radio access technology module 45 that is interposed between the air interface module and the processor. MS 10 also includes a memory that stores the operating system with program modules with which the processor interacts to make MS 10 operational (11), and value-enhancing application modules (APPL1, APPL2, . . . APPLn) that provide for various "smart" capabilities of MS 10, such as email service, web surfing, video downloads etc. These value-enhancing applications may be triggered, or "opened" (for execution) by a user that interacts with MS 10 or by some other application that is running on MS 10.

Operationally, modules 13, 14 and 15 enable MS 10 to be connected to a data network through GPRS network 20, whereas WiFi module 16 enables MS 10 to be connected to the Internet through Access Point (AP) 33, which may be a server or a computer that connects to the Internet via an Internet Service Provider (ISP). Use of modules 13, 14, and 15 can be almost concurrent, meaning that at any one instant or of those modules is the one that connects to the wireless access network through air interface 46, or essentially concurrent, meaning that a number of these modules can simultaneous apply signals to the air interface, limited only by the data that is applied to those modules by processor 19.

Wireless access network 20 comprises a plurality of Gateway GPRS Support Nodes (GGSNs), such as unit 21, that interface with network 30 via an internal network 22. A GGSN includes one or more Access Point Names (APNs), each being a service point that performs a specific task. The task may be performed within the APN module, in a separate processor within network 20 such as module 43, or in a particular server within some sub-network of network 30. Also connected to network 22 are Serving GPRS Support Nodes (SGSNs) that are each connected a Radio Access Network (RAN) and Serving Gateways (S-GWs) that are similarly connected to RANs. Each RAN employs a particular communication technology and, to illustrate that, FIG. 1 shows RANS 24, 25, 26, and 27 that operate in 2G, 3G, 4G, and FEMTO technologies, respectively. RANs the employ the 2G and 3G technologies are connected to SGSNs, RANs that employ the 4G technology are connected to S-GWs, and RANs that employ the FEMTO technology are connected to S-GWs through FEMTO Gateways (F-GWs). The RANs include their respective Radio Network Controllers (RNCs) and base stations. Although in the context of the GPRS the RANs are networks, they are shown in FIG. 1 as individual nodes, and for the purposes of this disclosure can be viewed as such.

Network 20 also includes a Mobile Switching Center (MSC) 28, and a Home Location Register (HLR) 29. The MSC sets up and releases the end-to-end connections, handles mobility and hand-over requirements during calls, and takes care of charging and real time pre-paid account monitoring. The HLR is a database that contains information about routing, to enable the MSC to map MSs such MS 10 to one or more GGSNs, to update the SGSNs and to store IP addresses. The signaling and data paths that pertain to the operation of the GPRS (in contrast to data of the MSs) is shown in FIG. 1 in dashed lines, and it should be noted that for sake of clarity many of the signaling paths are shown only in connection with one type of element, but it should be understood that like elements have like signaling paths (e.g. RANs 24, 25, 26, and 27 all have a signaling path the MSC 28). It should be understood that much of what the GPRS network does and how it operates is not disclosed herein because it is quite conventional and does not form a part of this subject disclosure.

In accord with the principles disclosed herein, collaboration is undertaken between the applications that run on MS 10 and the radio network. This is accomplished by GPRS network including a resource tracking module 41 that collects network state information and forwards it, via a chosen set of APIs, to MS 10. MS 10 utilizes this information in a manner that is beneficial to network 20 as well as to MS 10. The benefit to MS 10 is that is receives a higher quality of service, and the benefit to network 20 is that the load imposed on it is more balanced, and the network resources are more efficiently utilized which, of course, allows network 20 to provide service to numerous other mobile stations and thereby increase its revenue.

One of the places from where information is collected is a resource tracker in each RAN (illustrated in RAN 24 by the RT element). The RT element collects information about the state of the RNC and the "Node B." This information comprises signal to noise ratio (S/N), number of active users, overall traffic load, etc.

The other places from where information is collected are the Access Point Names that are associated with the various GGSN switches, which information pertains, for example, to the availability of the APNs to service requests. The information is communicated via messages in whatever format is convenient, and since at least some of this information is eventually communicated to MS 10, it is convenient to employ the currently available AT command set, which mobile stations are already designed to recognize. The AT command (expanded, perhaps) set is, of course, just an example of a chosen API, and other (perhaps more advanced) API, such as the Radio Interface Layer APIs can be chosen. The following table presents some examples of AT commands.

| AT Command | Effect |
| --- | --- |
| AT!BAND | Selects a set of frequency bands |
| AT+CSQ | Signal Quality |
| AT!GSTATUS? | Returns operational status |
| AT!ERR | Displays diagnostic info |
| AT+CBST | Select bearer service type |
| AT!STATUS | Phone activity status |
| AT+Func | Find phone functionality |
| AT+CLAC | List all available AT commands |
| AT+CGEQMIN=? | 3G quality of service profile (min acceptable) |

One example of use of the AT commands in the context of the disclosed subject matter is the AT+CSQ command, which relates to signal quality. It can be combined with additional information to present to MS 10 a score, or relative cost, for access via the different RANs, and the application in MS 10 can then use this information to request a different route, or to merely alter its operation to optimize its traffic rate. One such alteration may be to slow its rate to a minimum until the signal conditions improve. Another such alteration is to withhold its elastic traffic till the available access is good enough.

To elaborate, the mobile station receives this information and employs it to reduce traffic congestion on the network, to optimize use of limited resources within the RAN network, to enable smart application on MS 10 and thereby enhance user experience by adapting to RAN conditions, to increase revenue for the operator of, for example, RAN 26. The RAN through which MS 10 is connected to the network can delay traffic of applications that yield low revenues relative to traffic that yields high revenues.

FIG. 1 also includes an operator policies module 42 that causes the information that is available to MS 10 to be filtered pursuant to some chosen policy that is established. To give one example, a chosen PDP context can be hidden from MS 10 in network congestion areas so that an application is prevented from accessing the related services, or alternatively, the network can supply enhanced PDP context at an extra cost for accessing a service and thereby MS 10 can be coaxed to choose a lower cost route, if available (for example, choose the 2G RAN 24 rather than the busy 4G RAN 26 for uploading a large picture file from MS 10). Another example is when a user is on 3G or 4G access with video conferencing application running and is traveling at speed greater than 20 miles/hours avoid handoff to any Wi-Fi access point. Yet another example is when a user launches an application on a mobile station that requires monitoring of medical sensors and real time communication with his designated health care providers, it is desirable to take upmost care to deliver the sensors' information in a timely manner. The AT commands and the extended APIs are used to make sure link state information are acceptable at all times. If and when link state information fall below thresholds then the application and the network take additional measures to ensure delivery of the sensor information. One last example is when the network wishes to reduce overall congestion, user-generated video source streams are converted to H.265 if and when user is streaming on LTE or 3G network with signal to noise ration below the threshold.

To implement these capabilities in the mobile station, MS 10 includes a metrics resource metrics unit 18 that stores Radio Access Technologies (RAT) information (i.e., information about the RANs), and information about the APNs that are associated with the GGSN switches. Module 18 employs the stored information to affect the connections of the various applications of MS 10 through network 20, and exposes this information to the applications for their own respective control of their operation. The influence over the connections of the various applications of MS 10 through network 20 is exercised when the application is initiated and, advantageously, it is also exercised in response to changing conditions in the GPRS network while the application is active. The same holds true for influencing the operation of the various applications that are open (i.e., being executed).

Figure 2:
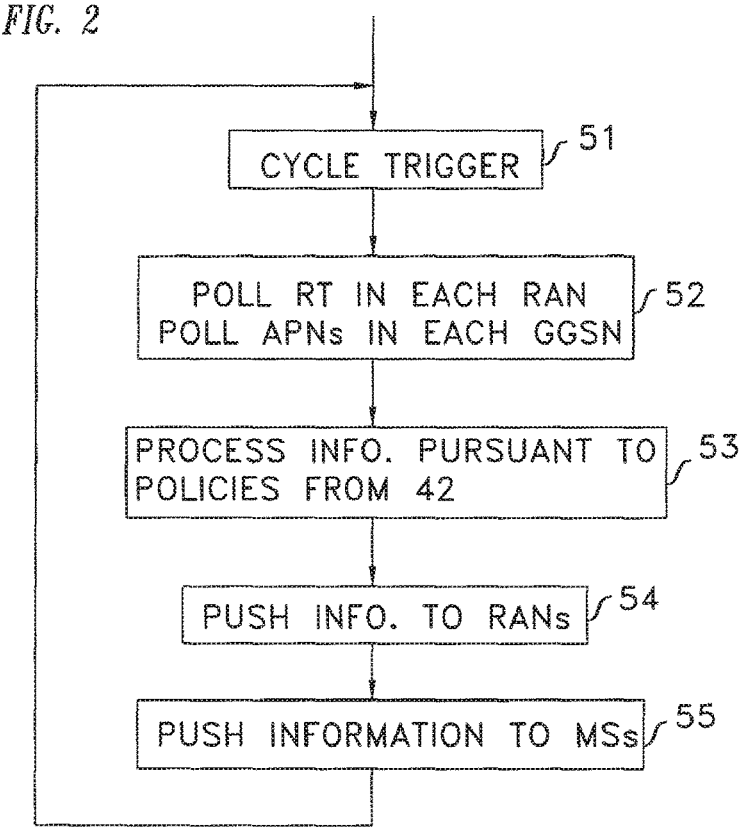
FIG. 2 presents a flow chart of one embodiment of a method that is executed within the interposed network.

FIG. 2 presents a flow diagram of one embodiment of a method in accord with the principles disclosed herein that is executed in resource tracking module 41 and, at least in part, in the various RANs. Step 51 forms the cycle triggering mechanism. It may operate by passing control to step 52 in response to any significant change in the state of the RANs or the APNs, or pass control to step 52 periodically. Step 52 polls the RT in each of the RANs and the APNs in each of the GGSNs, and passes control to step 53. Step 53 processes the obtained information pursuant to policies obtained from module 42 and stores the results. The processing can, for example, develop cost measures specifically for the different RANs (e.g., for RAN 26), or for the different RAN types (e.g., all 2G RANs). From step 53, control passes to step 54 which sends whatever information was collected by, or developed within, tracking module 41 to the RANs, and control then passes to step 55. Step 55 communicates the information to the MSs that are coupled to network 20, such as MS 10. This communication can be a broadcast, or a response to an inquiry. When broadcasted, the various RANs of network 20 may broadcast in unison, in a preselected order of succession, or randomly. The amount of this data is quite modest so whatever approach is selected, the communication protocol can easily be designed to enable the mobile stations to receive the data. For example, step 53 can communicate its information to the RANs in a seriatim fashion, and the RANs immediately broadcast the information.

As an aside, WiFi access points such as AP 33 also broadcast information about their status, such as S/N over the channel between MS 10 and AP 33, the amount of other traffic that the AP is carrying, etc.

In connection with the process that is executed in MS 10, it is recognized that whether information about the state of network 20 is passively received from network 20 or actively requested from network 20 must correspond to the method by which network 20 operates.

Figure 3:
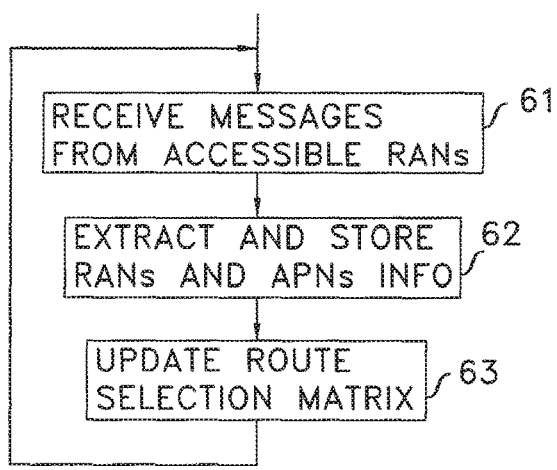
FIG. 3 presents a flow chart of one embodiment of a method for installing information in the mobile station to enable the mobile station to make intelligent connection route selections.

FIG. 3 presents a flow diagram of the method executed in MS 10 where the MS passively receives the network 20 state information needed for route selections because network 20 RANs broadcast the state information. Under control of processor 19, each of the RAT elements 14-16 within module 45 is activated, in rapid succession, to determine whether a broadcast from some RAN is detected. If so, the active state of that RAT element is maintained until the state information is received. Thus, for example, step 61 receives the messages from those RANs whose signals MS 12 can receive successfully, and passes control to step 62. Step 62 extracts the information from the messages about the RANs and about all reachable APNs and stores that information in resource metrics module 18. At least one piece of information, of course, is the identity of the RAN whose signals MS 12 received and the RATs that they employ. Thereafter, step 63 updates a route selection matrix in module 18, and returns control to step 61, to await the arrival of a next message. FIG. 5 presents an example of a selection matrix that resides in module 18.

a number of underlying decisions need to be made in determining the embodiment that a given MS employs. First, will the information that is stored in metrics unit 17 be obtained through passive acceptance of transmissions or though active polling of all accessible RANs. Second, will the MS manage the route selection only when the application initially opens, or more frequently—such as periodically or in response to a change in the state of the RANs and the APNs. Any of the choices presented by the above two questions are within the scope of the disclosed subject matter.

It is noted that this approach enables changes that occur within network 20 to be communicated quite quickly to MS 12. The opposite approach, where MS 12 polls for information, the RANs do not need to broadcast the state information of the network's RANs and APNs. Rather, only those RANs that are within communication range of MS 12 are requested to provide the state information whenever MS 12 desires it. In such an embodiment, step 61 would "poll for and receive messages" rather than just "receive messages" and a delay element would be includes in the loop to re-initiate the polling after a preselected delay.

Figure 4:
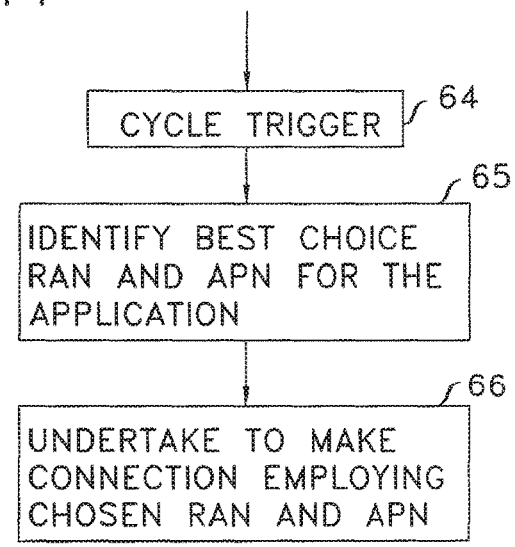
FIG. 4 presents a flow chart of one embodiment of a method for employing the installed information to make the route selections.

FIG. 4 presents a flow diagram of the method executed in MS 10 that utilizes the information that is available in modules 17 and 18. Step 64 is the trigger step. It passes control to step 64 when there is a substantial change in the selection matrix or when an application requests a server connection. When the trigger is an application that first requests connection to a server, step 65 determines, based on the type of application that makes the request, which RAN and which APN would result in the requested service being provided at lowest cost. It should be understood that the selection might be of a particular technology; e.g., "any 2G RAN," or may be of a particular RAN, based on an index that is stored in database 17 and which represents a relative cost for using the particular RAN.

Control them passes to step 66 which undertakes to make the connection using the chosen RAN and APN. It should also be understood that the undertaking by step 66 may be a mere request placed on network 20, and that the request might not be made. It is contemplated that step 66 includes an attempt to send a next-best connection request in case the first-submitted connection request is not fulfilled.

When the trigger in step 64 is a change in the selection matrix, steps 65 and 66 are executed for each of the applications that are running on MS 10. That is, a routing request message is sent on behalf of each of the open (i.e., operating or about to be operating) applications under consideration. Optionally, the mode of operation of an application itself may be altered based on RATs that are available to the application. For example, an application's user interface might be changed based on the bandwidth that is available to the application.

The above discloses an arrangement that provides enhanced capabilities and more efficient operation for both mobile stations and the wireless access network. While some of the resultant advantages are explicitly mentioned or implied above, it should be understood that other advantages and benefits accrue from the disclosed subject matter. For example, based on conditions for connection to different RANs, an application may split its traffic between two or more RANs simply for load balancing, for higher overall speed of communicating data, for insuring that sensitive data gets delivered with higher probability of success (by sending it twice, each time over a different RAN), or for security (based on the notion that an interloper is not simultaneously listening on the channels of two different RANs).

What is claimed is:

1. A system, comprising:
a processor; and
a memory that stores executable instructions that, when executed by the processor, facilitate performance of operations, comprising:
receiving, from a radio access network device of radio access network devices associated with a wireless access network, information relating to network resources that are available to be used by a device of the system; and
based on the information, determining, by the device, a radio access technology sub-module of radio access technology sub-modules of the device that is to be used to connect to one of the radio access network devices, wherein a first communication of first traffic associated with an application is controlled, based on the radio access technology sub-module, to delay the first communication of the first traffic that is determined to yield a lower revenue relative to a second communication of second traffic that is determined to yield a higher revenue than the lower revenue.

2. The system of claim 1, wherein the radio access technology sub-modules are associated with respective radio access technologies.

3. The system of claim 2, wherein the respective radio access technologies are associated with respective technical specifications and associated with respective radio access network devices of the radio access network devices.

4. The system of claim 1, wherein the information indicates a level of traffic congestion associated with the network resources.

5. The system of claim 4, wherein the determining the radio access technology sub-module comprises determining the radio access technology sub-module based on the level of traffic congestion and a cost of a specified packet data protocol context, and wherein the radio access technology sub-module is associated with a radio access technology that is associated with the one of the radio access network devices.

6. The system of claim 1, wherein the information comprises financial cost information relating to respective financial costs associated with accessing the radio access network devices, and wherein the determining the radio access technology sub-module further comprises determining the radio access technology sub-module to be used by the device to connect to the one of the radio access network devices based on the financial cost information.

7. The system of claim 1, wherein the information comprises cost information relating to respective costs associated with accessing the radio access network devices, and wherein the determining the radio access technology sub-module further comprises:
determining that the one of the radio access network devices is associated with incurring a lowest cost for provision of a service relative to other costs of other radio access network devices of the radio access network devices other than the one; and
in response to determining that the one of the radio access network devices is associated with incurring the lowest cost for the provision of the service, determining that the radio access technology sub-module is to be used by the device to connect to the one of the radio access network devices.

8. The system of claim 1, wherein the information comprises state information regarding respective states of access point devices and radio network controller devices respectively associated with the radio access network devices, and wherein the determining the radio access technology sub-module further comprises determining the radio access technology sub-module to be used by the device to connect to the one of the radio access network devices based on the state information.

9. The system of claim 1, wherein the operations further comprise interfacing the application associated with the device with sensors that facilitate sensing conditions.

10. The system of claim 9, wherein the sensing conditions relate to a health status associated with a user identity.

11. A method, comprising:
receiving, by a device comprising a processor from radio access network devices associated with a wireless access network, data relating to network resources available to be employed by the device; and based on the data relating to the network resources, determining, by the device, a radio access technology sub-module of radio access technology sub-modules of the device that is to be used to connect to a radio access network device of the radio access network devices, wherein a first communication of first traffic associated with an application is controlled, based on the radio access technology sub-module, to delay the first communication of the first traffic that is determined to produce a first revenue to occur after a second communication of second traffic that is determined to produce a second revenue that is higher than the first revenue.

12. The method of claim 11, wherein the data relates to an amount of traffic congestion associated with the network resources.

13. The method of claim 12, wherein the determining the radio access technology sub-module comprises determining the radio access technology sub-module of the radio access technology sub-modules based on respective accessibility of respective services, and wherein the respective accessibility of the respective services is determined based on the amount of the traffic congestion.

14. The method of claim 13, wherein respective packet data protocol contexts are associated with the respective services, and wherein, based on the amount of the traffic congestion, a first portion of the respective packet data protocol contexts are not perceivable by the device to prevent access, by the device, to a second portion of the respective services associated with the first portion of the respective packet data protocol contexts.

15. The method of claim 11, wherein the data relating to the network resources comprises cost data relating to costs respectively associated with accessing the radio access network devices, and wherein the determining the radio access technology sub-module further comprises determining, based on the cost data, the radio access technology sub-module of the radio access technology sub-modules of the device that is to be used to connect to the radio access network device of the radio access network devices.

16. The method of claim 11, wherein the data relating to the network resources comprises state data regarding respective states of base station devices and radio network controller devices respectively associated with the radio access network devices, and wherein the determining the radio access technology sub-module further comprises determining the radio access technology sub-module to be used by the device to connect to the radio access network device based on the state data.

17. The method of claim 16, wherein the state data comprises signal-to-noise ratio data and traffic load data relating to respective overall traffic loads associated with the base station devices and the radio network controller devices.

18. The method of claim 11, wherein the radio access network device is a first radio access network device, and wherein the method further comprises:
based on the data relating to network resources, allocating, by the device, a first portion of the first traffic associated with the application employed by the device for the first communication via the first radio access network device and a second portion of the first traffic associated with the application for a third communication via a second radio access network device of the radio access network devices;
communicating, by the device, the first portion of the first traffic via the first radio access network device; and
communicating, by the device, the second portion of the first traffic via the second radio access network device.

19. A non-transitory machine-readable medium, comprising executable instructions that, when executed by a processor, facilitate performance of operations, comprising:
determining respective resource availabilities of respective radio access network devices associated with a wireless access network based on respective items of resource availability data received from the respective radio access network devices; and
transmitting processed data relating to the respective resource availabilities to the respective radio access network devices to facilitate transmitting at least a portion of the processed data to a device to enable the device to determine, based on at least the portion of the processed data, a radio access technology sub-module of radio access technology sub-modules of the device to be used to connect to a radio access network device of the respective radio access network devices, wherein a first communication of first traffic associated with an application is managed, based on the radio access technology sub-module, to defer the first communication of the first traffic associated with a first revenue to have the first communication occur subsequent to a second communication of second traffic associated with a second revenue that is determined to be higher than the first revenue.

20. The non-transitory machine-readable medium of claim 19, wherein the operations further comprise:
tracking conditions associated with the respective radio access network devices to facilitate the receiving of the respective items of resource availability data; and
determining the processed data based on the determining the respective resource availabilities of the respective radio access network devices.

* * * * *